United States Patent
Emmot et al.

(10) Patent No.: US 6,919,894 B2
(45) Date of Patent: Jul. 19, 2005

(54) UNIFIED MEMORY DISTRIBUTED ACROSS MULTIPLE NODES IN A COMPUTER GRAPHICS SYSTEM

(75) Inventors: Darel N. Emmot, Ft. Collins, CO (US); Byron A. Alcorn, Ft. Collins, CO (US)

(73) Assignee: Hewlett Packard Development Company, L.P., Houston, TX (US)

( * ) Notice: Subject to any disclaimer, the term of this patent is extended or adjusted under 35 U.S.C. 154(b) by 9 days.

(21) Appl. No.: 10/624,576

(22) Filed: Jul. 21, 2003

(65) Prior Publication Data

US 2004/0021670 A1 Feb. 5, 2004

Related U.S. Application Data

(63) Continuation of application No. 09/768,664, filed on Jan. 24, 2001, now Pat. No. 6,657,632.

(51) Int. Cl.[7] .............................................. G06F 15/16
(52) U.S. Cl. ...................... 345/502; 345/505; 345/506; 712/16
(58) Field of Search ................................ 345/502, 503, 345/504, 505, 506; 712/11, 16; 430/270.1, 326, 905, 907, 322

(56) References Cited

U.S. PATENT DOCUMENTS

| | | | |
|---|---|---|---|
| 4,958,302 A | | 9/1990 | Fredrickson et al. |
| 4,965,716 A | | 10/1990 | Sweenet |
| 4,975,833 A | | 12/1990 | Jinzaki |
| 5,131,080 A | | 7/1992 | Fredrickson et al. |
| 5,448,698 A | | 9/1995 | Wilkes |
| 5,657,479 A | | 8/1997 | Shaw et al. |
| 5,696,533 A | | 12/1997 | Montgomery et al. |
| 5,838,334 A | | 11/1998 | Dye |
| 5,917,505 A | | 6/1999 | Larson |
| 5,999,183 A | * | 12/1999 | Kilgariff et al. ............ 345/418 |
| 6,057,851 A | | 5/2000 | Luken et al. |
| 6,106,468 A | | 8/2000 | Dowdell |
| 6,108,007 A | | 8/2000 | Shochet |
| 6,125,368 A | * | 9/2000 | Bridge et al. ............... 707/201 |
| 6,181,346 B1 | | 1/2001 | Ono et al. |
| 6,232,974 B1 | | 5/2001 | Horvitz et al. |
| 6,678,772 B2 | * | 1/2004 | McKenney ................. 710/200 |
| 6,740,470 B2 | * | 5/2004 | Tan et al. ................. 430/271.1 |
| 6,743,562 B2 | * | 6/2004 | Momota et al. ............ 430/170 |

\* cited by examiner

Primary Examiner—Matthew C. Bella
Assistant Examiner—Mackly Monestime

(57) ABSTRACT

A system is described that is broadly directed to a system of integrated circuit components. The system comprises a plurality of nodes that are interconnected by communication links. A random access memory (RAM) is connected to each node. At least one functional unit is integrated into each node, and each functional unit is configured to carry out a predetermined processing function. Finally, each RAM includes a coherency mechanism configured to permit only read access to the RAM by other nodes, the coherency mechanism further configured to permit write access to the RAM only by functional units that are local to the node.

19 Claims, 9 Drawing Sheets

UNIFIED MEMORY DISTRIBUTED ACROSS MULTIPLE NODES IN A COMPUTER GRAPHICS SYSTEM

CROSS REFERENCE TO RELATED APPLICATION(S)

This is a continuation of application Ser. No. 09/768,664 filed on Jan. 24, 2001, now U.S. Pat. 6,657,632, which is hereby incorporated by reference herein.

BACKGROUND OF THE INVENTION

1. Field of the Invention

The present invention relates to computer graphics systems and, more particularly, to a novel distributed memory structure in a computer graphics system.

2. Discussion of the Related Art

Computer graphics systems are commonly used for displaying graphical representations of objects on a two-dimensional video display screen. Current computer graphics display systems provide highly detailed representations and are used in a variety of applications. A computer graphics display system generally comprises a central processing unit (CPU), system memory, a graphics machine and a video display screen.

In typical computer graphics display systems, an object to be presented on the display screen is broken down into graphics primitives. Primitives are basic components of a graphics display and may include points, lines, vectors and polygons (e.g., triangles and quadrilaterals). Typically, a hardware/software scheme is implemented to render, or draw, the graphics primitives that represent a view of one or more objects being represented on the display screen.

Generally, the primitives of the three-dimensional object to be rendered are defined by the host CPU in terms of primitive data. For example, when the primitive is a triangle, the host computer may define the primitive in terms of the X, Y and Z coordinates of its vertices. Additional primitive data may be used in specific applications. Rendering hardware interpolates the primitive data to compute the display screen pixels that represent each primitive.

The graphics machine generally includes a geometry accelerator, a rasterizer, a frame buffer controller and a frame buffer. The graphics machine may also include texture mapping hardware. The geometry accelerator receives vertex data from the host CPU that defines the primitives that make up the view to be displayed. As is known, the operations of the geometry accelerator are computationally very intense. One frame of a three-dimensional (3-D) graphics display may include on the order of hundreds of thousands of primitives. To achieve state-of-the-art performance, the geometry accelerator may be required to perform several hundred million floating point calculations per second. Furthermore, the volume of data transferred between the host computer and the graphics hardware is very large. Additional data transmitted from the host computer to the geometry accelerator includes illumination parameters, clipping parameters and any other parameters needed to generate the graphics display.

As is known, a rasterizer receives data representing figures or objects and then provides the pixel-like representation of the figures. As is also known, texture mapping involves applying one or more point elements (texels) of a texture to each point element (pixel) of the displayed portion of the object to which the texture is being mapped. Texture mapping hardware is conventionally provided with information indicating the manner in which the texels in a texture map correspond to the pixels on the display screen that represent the object. Each texel in a texture map may be defined by S and T coordinates which identify its location in the two-dimensional texture map. For each pixel, the corresponding texel or texels that map to it are accessed from the texture map, and incorporated into the final R, G, B values generated for the pixel to represent the textured object on the display screen. As is known, in additional to two-dimensional texture maps, one dimensional, three dimensional, and even other dimensional texture maps are also known. In this respect, the two-dimensional texture map has been mentioned for illustrative purposes only.

It should be understood that each pixel in an object primitive may not map in one-to-one correspondence with a single texel in the texture map for every view of the object. For example, the closer the object is to the view port represented on the display screen, the larger the object will appear. As the object appears larger on the display screen, the representation of the texture becomes more detailed. Thus, when the object consumes a fairly large portion of the display screen, a large number of pixels is used to represent the object on the display screen, and each pixel that represents the object may map in one-to-one correspondence with a single texel in the texture map, or a single texel may map to multiple pixels. However, when the object takes up a relatively small portion of the display screen, a much smaller number of pixels is used to represent the object, resulting in the texture being represented with less detail, so that each pixel may map to multiple texels. Each pixel may also map to multiple texels when a texture is mapped to a small portion of an object. Resultant texel data is calculated for each pixel that maps to more than one texel, and typically represents an average of the texels that map to that pixel.

To more particularly illustrate a conventional graphics system, reference is made to FIG. 1, which is a diagram illustrating a graphics pipeline 10 as is known. It should be noted at the outset that there are a variety of alternative manners to illustrate the graphics pipeline 10 illustrated in FIG. 1, and that the diagram of FIG. 1 is presented for illustration only.

As illustrated, a host computer 20 typically communicates with the graphics hardware across a high-speed bus, such as an AGP (accelerated graphics port) bus or a PCI (peripheral component interconnect) bus. A host interface 22 is typically provided at the front end of the graphics hardware to interface with the high-speed bus. A format block 24 is provided downstream of the host interface 22. One or more geometry accelerators 26 and 27, and one or more rasterizers 30 and 31 are provided downstream of the format block 24. The operation of geometry accelerators and rasterizers, and methods/configurations for operating multiples of these components are known, and therefore need not be described herein.

Downstream of the rasterizers 30 and 31 are texture mapping hardware 34, a fragment processor 36, the Z-buffer 38, and blend hardware 40. The function and operation of each of these components are known and need not be described herein. As is known, however, texture mapping hardware systems typically include a local memory subsystem 50 that stores data representing a texture associated with the object being rendered.

Downstream of the texture mapping hardware are subsystems including display composition 52, display timing 54, digital to analog converter 56, and a display 58. As is known, the display composition hardware 52 processes different object/primitive layers to determine the color of a given pixel to be displayed.

Consistent with the general architecture and data flow of a graphics pipeline 10 like that of FIG. 1, prior art systems were known that provided multiple/parallel rasterizers and multiple/parallel texture mapping subsystems, wherein each of the rasterizers and texture mapping components communicated with a dedicated local memory.

Other systems are known that combine the rasterization hardware and texture mapping hardware. In such systems there may be multiple/parallel combined rasterization/texture mapping subsystems. Such systems typically had dedicated memory for each rasterizer/texture mapping component. As is known, such systems segmented and dedicated portions of the display to the different rasterizer/texture mapping components for processing. However, in order to process primitives extending across segment borders, systems implementing this type of parallelism often duplicated texture maps and other data across the separate memories, resulting in both capacity and bandwidth problems. Stated another way, the texture maps previously discussed cannot be isolated. Instead, texture data is duplicated in each isolated display segment or domain. The bandwidth problems were further compounded by the granularity in which data is retrieve from memory (i.e., burst reads).

Accordingly, it is desired to provide a graphics system that is scalable while at the same time effectively addresses the bandwidth demands and other shortcomings of prior art graphics systems.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

The present invention is broadly directed to a system of integrated circuit components. The system comprises a plurality of nodes that are interconnected by communication links. A random access memory (RAM) is connected to each node. At least one functional unit is integrated into each node, and each functional unit is configured to carry out a predetermined processing function. Finally, each RAM includes a coherency mechanism configured to permit only read access to the RAM by other nodes, the coherency mechanism further configured to permit write access to the RAM only by functional units that are local to the node.

In a preferred embodiment, the system broadly described above may be implemented in a graphics processing system. In such a system, nodes may include functional units such as geometry accelerators, rasterizers, tilers, shaders, etc. Also, it should be appreciated that nodes need not be coextensive with physical integrated circuit boundaries. That is, a single integrated circuit component may include a single node. Alternatively, however, a single integrated circuit component may include multiple nodes. Further, in the preferred embodiment, each RAM that is connected to a node is segmented such that specified segments of the RAM are allocated to specific functional units of the node. Write access to the RAM is preferably limited to the connected node, while read access may be allowed to all nodes in the system.

DESCRIPTION OF THE DRAWINGS

The accompanying drawings incorporated in and forming a part of the specification, illustrate several aspects of the present invention, and together with the description serve to explain the principles of the invention. In the drawings.

Figure 1:
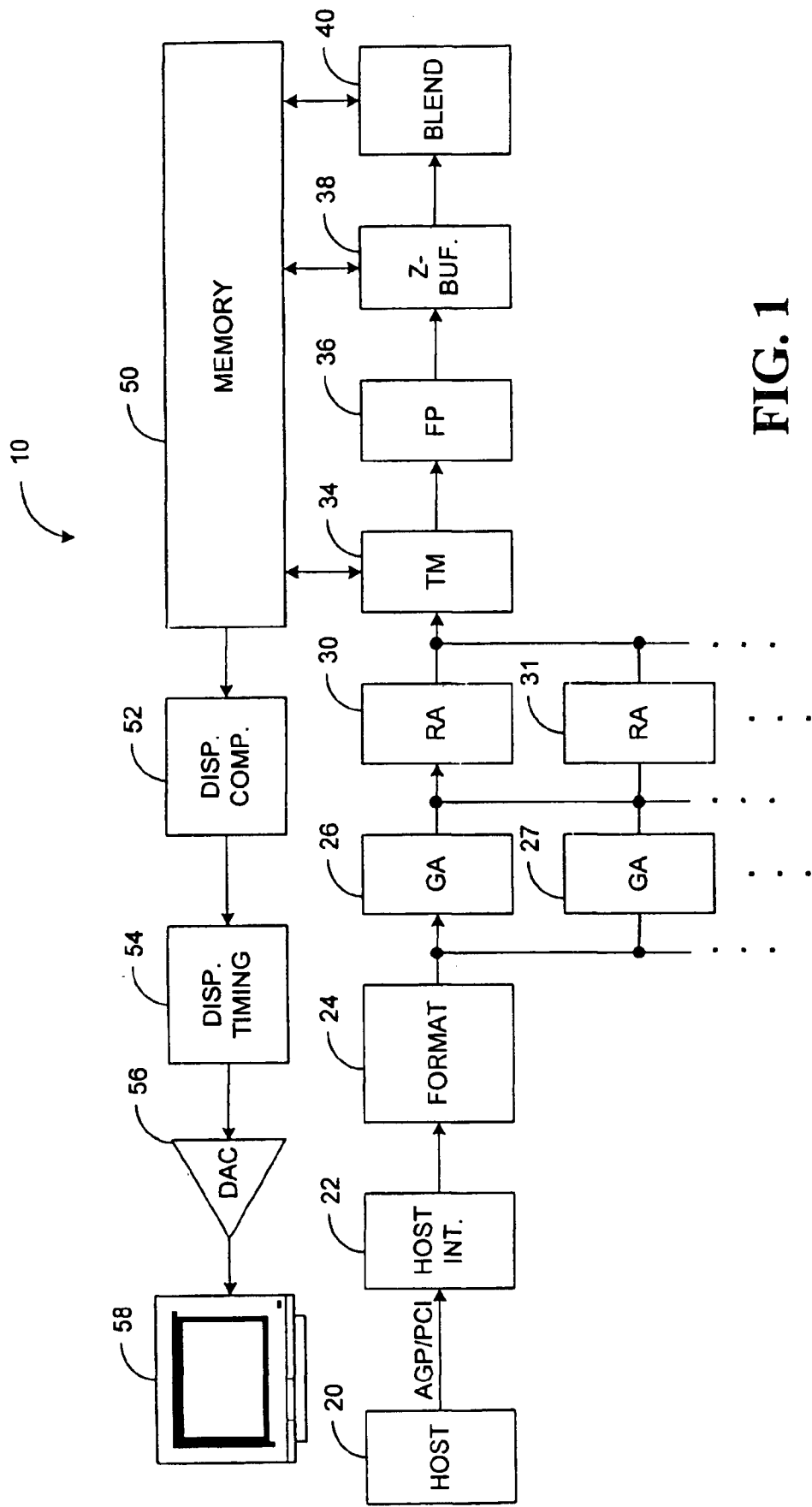
FIG. 1 illustrates a block diagram of a computer graphics system in accordance with the prior art.

Reference will now be made in detail to the description of the invention as illustrated by the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

DETAILED DESCRIPTION OF THE PREFERRED EMBODIMENT

Having summarized various aspects of the present invention, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims. The drawings have illustrated the invention in the context of a graphics processing system. It will be appreciated by persons skilled in the art with reference to the discussion herein that the invention is not limited to graphics systems, but rather is extensible to other types of processing systems as well.

Environment of the Preferred Embodiment

Before discussing certain central features and aspects of the present invention, reference will first be made to describe the environment in which the present invention resides and operates. In this regard, the present invention resides and operates is a unique nodal architecture in which nodes comprise functional units that intercommunicate across communication links. As will be understood from the discussion that follows, the unique design of this nodal architecture provides particularly efficient performance in a bandwidth-intensive operating environment. Further, in the embodiment that will be described herein, the communication links are serial links. It will be appreciated, however, that other (i.e., non-serial) communication links may be implemented consistent with the scope and spirit of the invention.

Figure 2A:
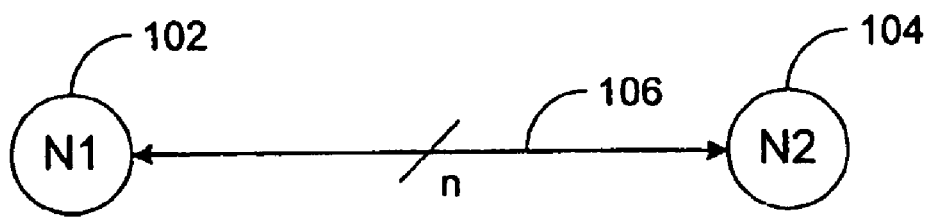
FIGS. 2A and 2B are diagrams illustrating a high-level nodal architecture, in which functional nodes are interconnected through serial links, in accordance with the invention.

Referring to FIG. 2A, a system having two nodes 102 and 104 is shown. The two nodes 102 and 104 intercommunicate across a plurality of serial links 106. The number of serial links may vary from system to system, depending upon the speed of the serial links, and the bandwidth requirements of the system. As mentioned above, texture mapping places high memory bandwidth demands on a graphics system. Thus, in systems like computer graphics systems, more communication links 106 will generally be desired than in lower bandwidth systems.

Figure 2B:
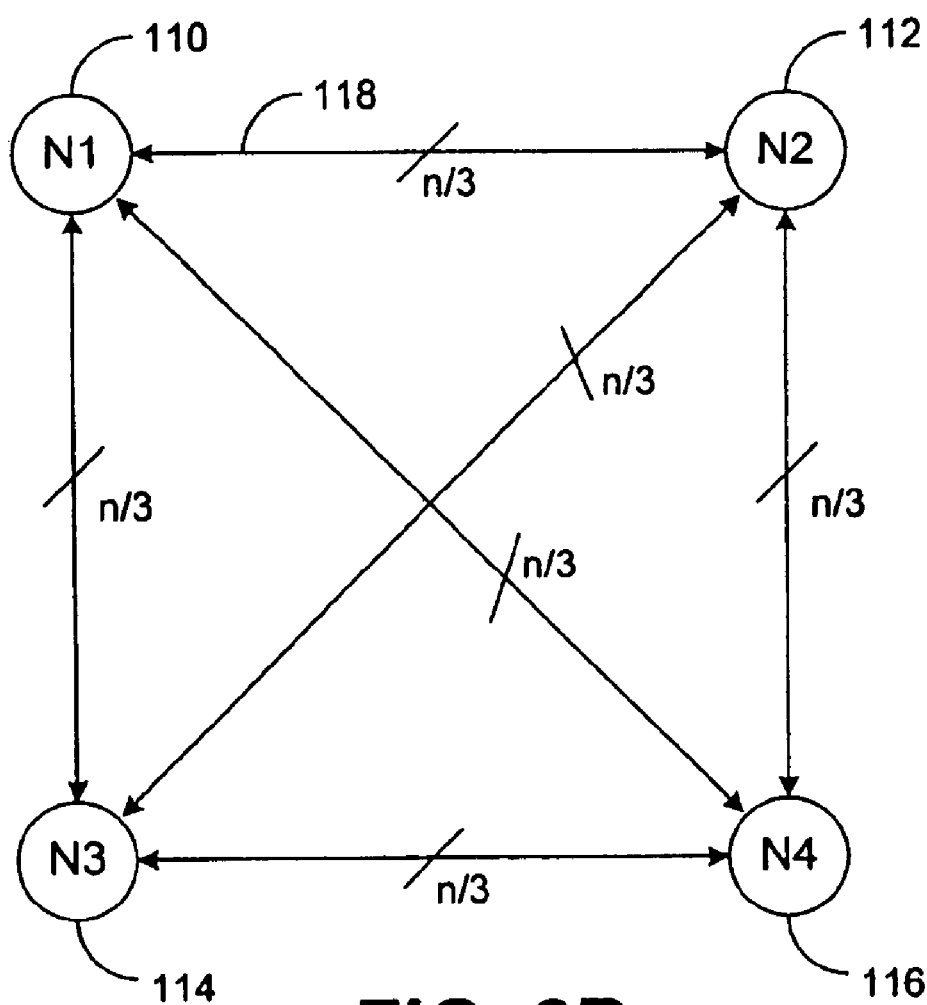

Referring to FIG. 2B, a system having four nodes 110, 112, 114, and 116 is shown. Like in the two node system of FIG. 2A, the four nodes 110, 112, 114, 116 intercommunicate across a plurality of serial links (e.g., 118). In a four node system, however, the number of serial links interconnecting any two given nodes is reduced. In this regard, as the system is partitioned up into more functional processing nodes, fewer serial links are required to interconnect between each of the nodes. In the abstract example presented in FIGS. 2A and 2B, if n serial links are required to support the system bandwidth of the two-node system of FIG. 2A, then mathematically n/3 serial links will be required to interconnect between each of the nodes in the four node system of FIG. 2B.

For purposes of understanding the present invention, however, the significant point to observe from FIGS. 2A and 2B is that a bandwidth-intensive processing system may be partitioned up into functional nodes, whereby the functional nodes are designed to operate cooperatively to carryout the function of the system as a whole. In addition, the functional units intercommunicate across a plurality of serial links.

Figure 3:
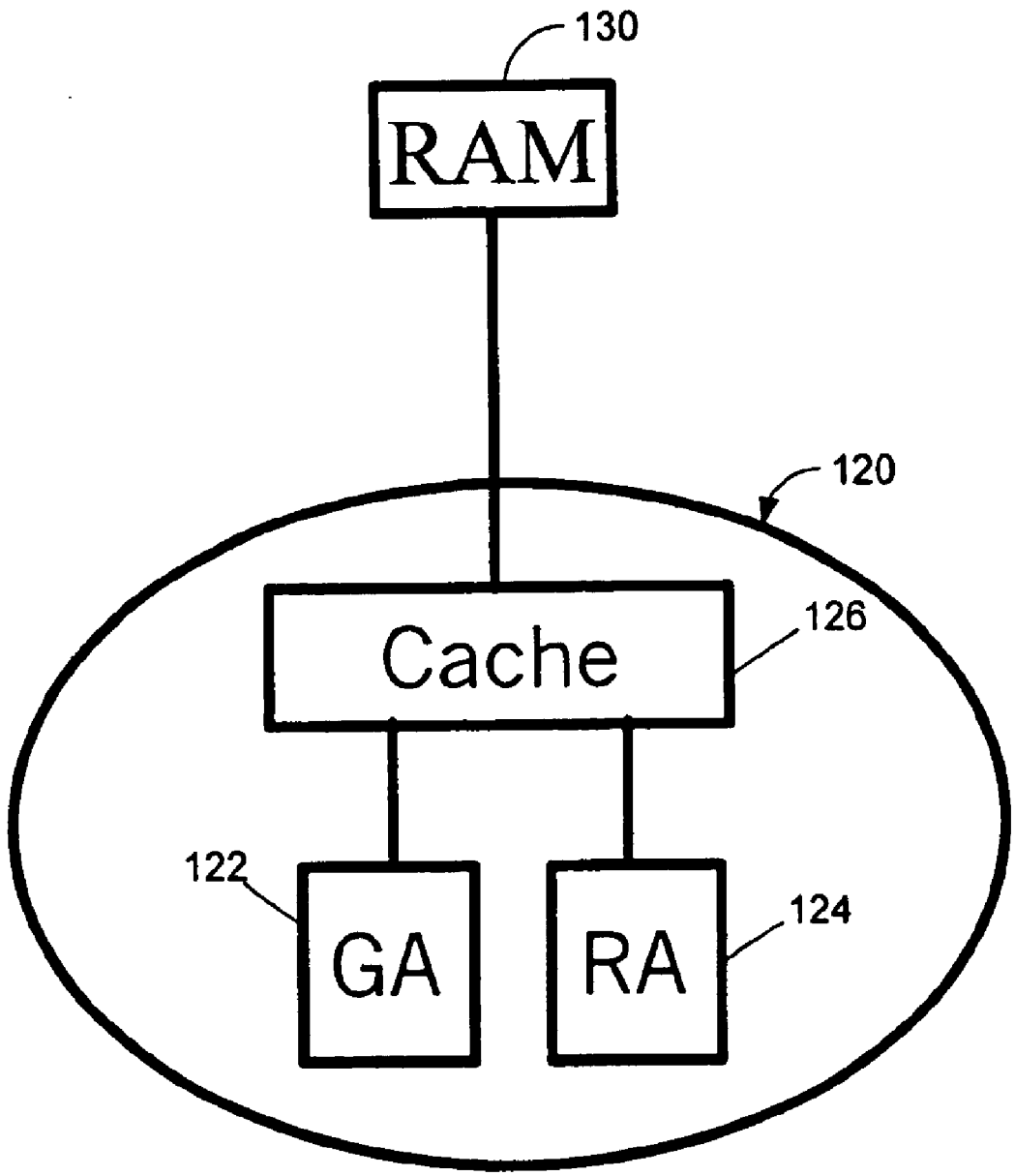
FIG. 3 is a diagram illustrating a functional node containing a geometry accelerator, a rasterizer, and a cache in communication with a local RAM.

Having summarized this basic architecture, reference will now be made to drawings that illustrate one possible structure of the functional units in a graphics processing system, and broadly to the manner in which the functional units intercommunicate to transfer data and cooperatively carry out their operating functions. In this regard, reference is made to FIG. 3, which illustrates a node 120 that may be used in a high-performance graphics processing system. As illustrated, such a node 120 may include an integrated geometry accelerator 122, rasterizer 124, and a cache 126. The general functional operation of the geometry accelerator 122, rasterizer 124, and cache 126 are similar to that of known, prior art systems. Therefore, this functional operation need not be described herein.

Figure 4:
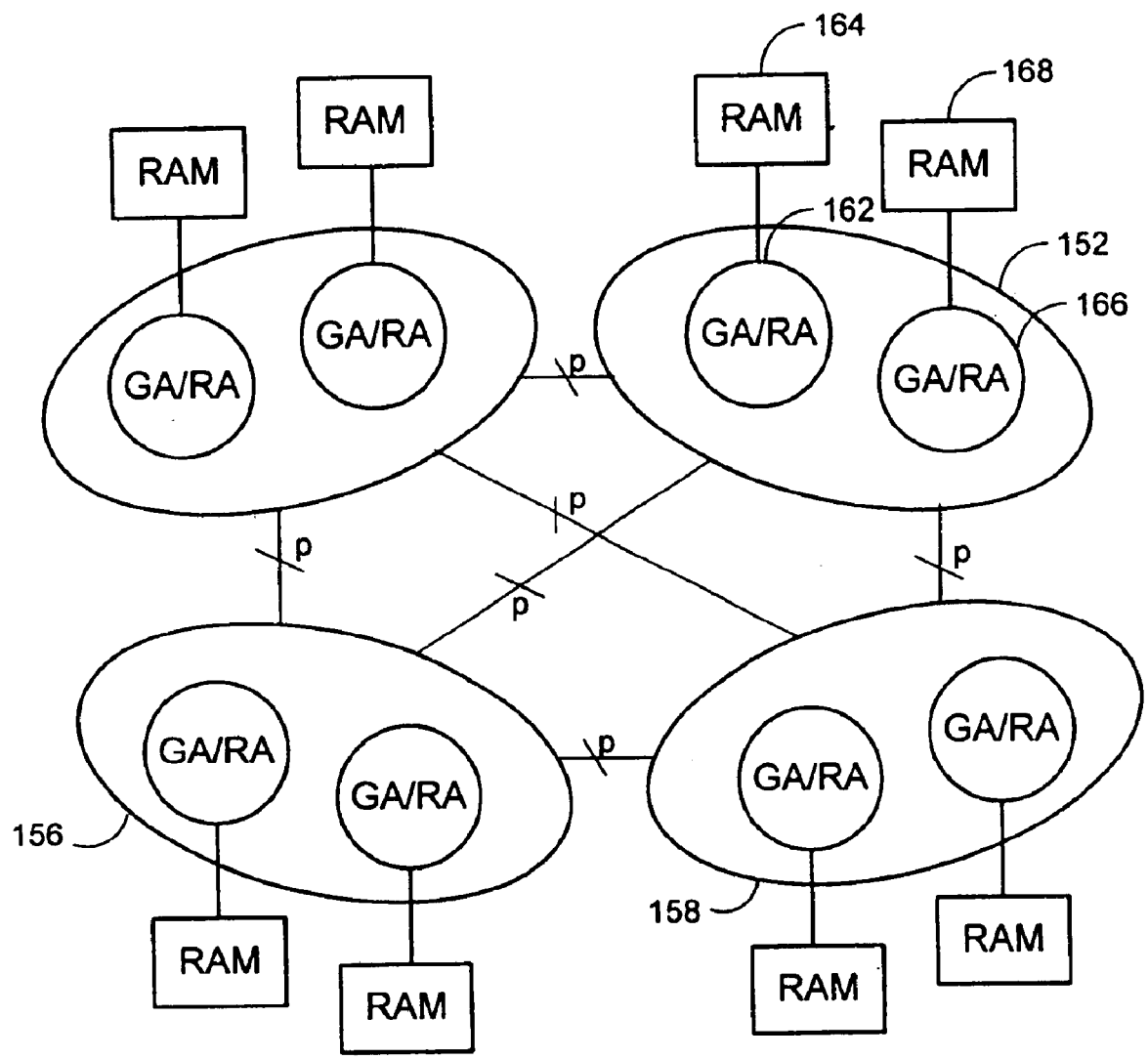
FIG. 4 is a diagram illustrating a nodal configuration in a multiple-chip architecture, in accordance with one embodiment of the invention.

Reference is now made to FIG. 4, which illustrates a plurality of nodes interconnected as they may be in a given graphic processing system. FIG. 4 illustrates the notion that node development is largely independent of chip partitioning. Instead, chip integration and chip partitioning are guided by factors such as pin count, economy of integration, granularity of scalability, etc. With regard to the granularity of scalability, it will be appreciated that if there is one node per chip, then the system may be scaled one node at a time. If, however, there are four nodes per chip, then the system must be scaled four nodes at a time. In the figure, four chips 152, 154, 156, and 158 are depicted. Each chip includes two nodes. For example, chip 152 includes nodes 162 and 166. Node 162 communicates with RAM 164, and node 166 communicates with RAM 168. Thus, such an embodiment is scalable by increments of two nodes.

FIG. 4 also depicts the RAM elements 164 and 168 as being separate from the chip 152. In one embodiment, there may be a separate, dedicated RAM device per node. Such an approach provides for a finer granularity, yields better efficiency, and reduces the complexity of the design of internal functions. In another embodiment (not shown), however, a single RAM device may be utilized. The single RAM device of such an embodiment may be partitioned, however, such that individual partitions are allocated to the individual nodes. The design determination as to whether to allocate single memory devices or merely a partition of a memory device to individual nodes may be based upon various design-specific considerations, such as bandwidth requirements. In yet another embodiment, the RAM may be embedded onto the same chip as the connected node.

As is further illustrated in FIG. 4, each node is connected to every other node through a plurality (p) of serial links. As previously described, the number of serial links that interconnect the various nodes will be guided by bandwidth requirements, and may therefore vary from system to system. In a given graphics system, a number of geometry accelerator/rasterizer (GA/RA) nodes may be provided to enhance the performance gained by the parallelism of these functions. In some nodes, these functions, or at least a portion of these functions, may be grouped with other functions.

Figure 5:
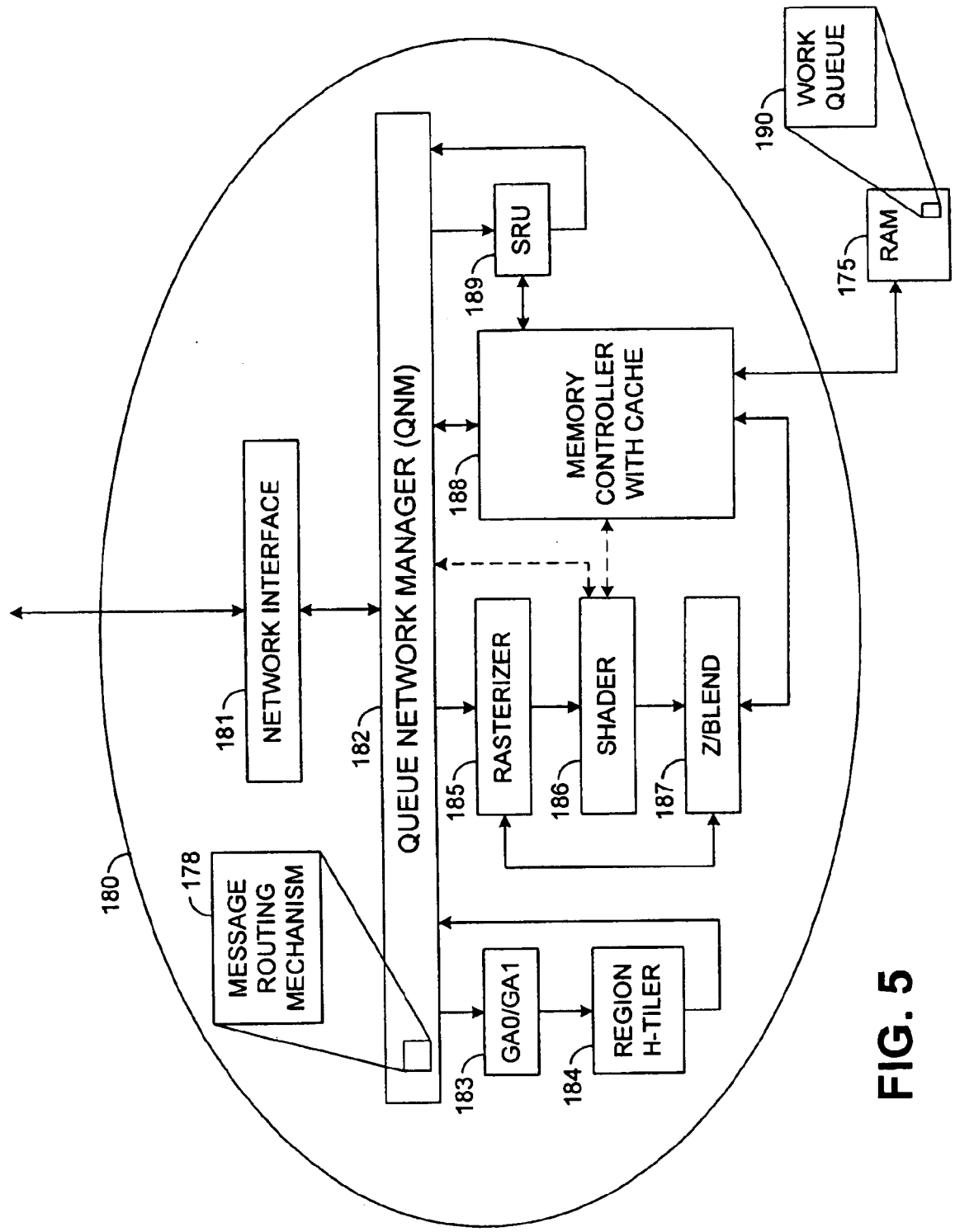
FIG. 5 is a diagram illustrating various functional elements, which may be embodied in a single node of one embodiment of the invention.

Reference is now made to FIG. 5, which illustrates a node of a preferred embodiment in more detail. In this illustration, a node may more particularly include a geometry accelerator 183 with a hierarchical tiler 184, which together provide for accurate region selection. A hierarchical rasterizer 185, shader 186, and z/blend 187 elements having parametric interpolation allow for simplified hardware to interpolate many parameters. Preferably, the shader supports parametric texturing and the z/blend supports z test.

Also provided is a memory controller 188 with an on-board cache, for managing the RAM 175 that is local to the node 180. A screen refresh unit (SRU) 189 is also illustrated. The SRU 189 includes display composition functions and operates to compose RGB values to the screen. The general function and operation of these components is generally known and should be understood by people skilled in the art. Accordingly, they need not be described herein.

FIG. 5 also illustrates a network interface 181 and a queue network manager (QNM) 182. The QNM 182 is a processor that is programmed to operate on work queues (described below), and also to direct the flow of data and instructions into the functional unit(s) of the node 180. As will be discussed below, the programmability of the QNM 182 enhances the versatility of a system constructed in accordance with the invention.

The network interface 181 is simply the circuitry that interfaces the node 180 to the multiple serial links that interconnect other nodes in the network of nodes. The QNM 182 is designed to interface the different nodes/functional units together through the use of work queues 190 (which will be described below). In this regard, the QNM 182 segments and collates work queues 190 for direction to parallel functional units. The identity of packets arriving upon a particular serial link associate that packet with a particular logical work queue 190. Work queues 190 are stored in the local RAMs 175, and the QNM 182 is preferably designed to support multiple threads. The partitioning of resources among the threads is determined by the programmers for a particular application. Since this partitioning is not limiting upon the present invention, it need not be described herein.

Finally, FIG. 5 illustrates a routing mechanism 178 that is a part of the QNM 182. The routing mechanism 178 is responsible for the routing of messages to the various nodes.

Table 1, below, illustrates the work queue message format for a message in accordance with one embodiment of the invention. As illustrated by Table 1 and Table 2 below, messages may generally be provided in one of two basic formats. The first format (defined by setting where bit 31 to a 1) allows 1 to 128 coherent words, with the first including the data word count and identifiers of the message content. The second format (defined by setting bit 31 to a 0) is two words in length, and supports Direct Draw accesses of 2D surfaces one pixel at a time.

TABLE 1

| MSB | | | | | | | | | | | | | | | | | | | Work Queue Message | | | | | | | | | | | | | LSB |
|---|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 0 | rw | Data Count | | | | | | Type | | | Command | | | | | | | | | | | | | | | | | | | | |
| Data [1] | | | | | | | | | | | | | | | | | | | | | | | | | | | | | | | |
| ... | | | | | | | | | | | | | | | | | | | | | | | | | | | | | | | |
| Data [Data Count] | | | | | | | | | | | | | | | | | | | | | | | | | | | | | | | |
| 1 | rw | Byte Enable | | | | | | UaddressY | | | | | | | | | UAddressX | | | | | | | | | | | | | | |
| Data | | | | | | | | | | | | | | | | | | | | | | | | | | | | | | | |

As will be described in more detail below, each message includes an identification of the destination node that the message is destined for. Established routing technology and algorithms may be implemented within the routing mechanism 178 for redirecting and forwarding messages that arrive at intervening nodes. Since such routing algorithms are known, they need not be described herein.

The foregoing description of the elements of FIG. 5 has been intended to provide only a high-level illustration of one potential node design in a graphics processing system. The present invention, however, is not limited by, or dependent upon, a particular node design. Furthermore, persons skilled in the graphics processing art will appreciate and understand the operation of the elements generally described above. Accordingly, further description need not be provided herein.

Figure 6:
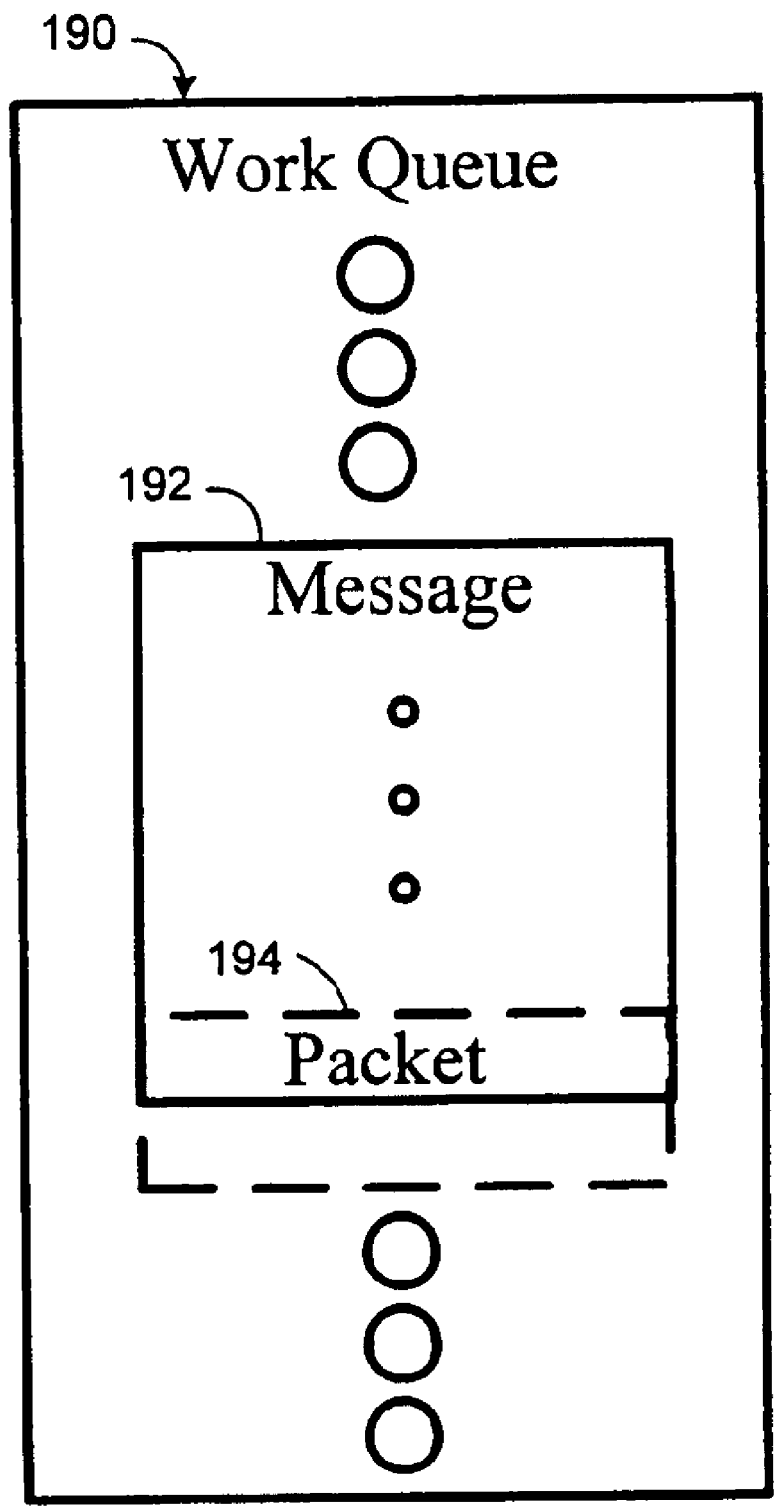
FIG. 6 is a block diagram illustrating a work queue, which is used for controlling the operation of a functional unit.

Reference is now made to FIG. 6, which is a block diagram illustrating a work queue 190, used to control the functional operation of the various nodes. In essence, a work queue is a logical FIFO. For a first node to effect the operation of a second node, the first node produces a message or sequence of messages that are communicated to the second node, and placed in its work queue 190. The second node later carries out the operation requested or specified by the first node, when the second node processes that message within its work queue. In this regard, a work queue 190 includes a plurality of messages 192. Generally, a message is a command or instruction for a functional unit that is on the node. A data packet 194 is also illustrated. A data packet is a mechanism that is used to communicate a message, and is the smallest amount of data communicated across the communication links.

Although there are a variety of forms that work queues 190 and messages may take, consistent with the scope and spirit of the present invention, the form of these work queues and messages of a preferred embodiment is more fully set forth in Tables 1 through 6 below.

Table 2, below, defines the general operation or content of the message fields of Table 1.

TABLE 2

| Field | Bits | Function |
|---|---|---|
| Pc | 31 | Distinguish messages into two flavors:<br>1-Pixel Exactly 1 pixel data word accompanies the message.<br>0-Command Allows DataCount words to accompany a message. |
| rw | 30 | Read-Write select. 0-Write; 1-Read. |
| Data Count | 29:23 | Specifies [0 . . . 127] inclusive data words to accompany a buffered message. |
| Type | 22:20 | Selects 1-of-8 message types, four of which are described independently.<br>0-State<br>2–4-Reserved<br>5-Geometry Vertex<br>6-Rasterizer Vertex<br>7-QNM |
| Command | 19:0 | Selects operators and physical registers within the space specified by Type. |
| UaddressX\|Y | 23:0 | Extended unbuffered address space allows access to 8 K × 2 K Direct Draw surfaces. |
| Byte Enable | 29:26 | Byte Enables; 1 enables change, correspond to [31:24],[23:16],[15:8] [7:0]. |
| Data | 31:0 | Context dependent data. |

As shown in Table 1, three bits define the type of message. As shown in Table 2, when the value of these three bits is zero, the message is a "State" type message. The State type message may be used by functional unit types to access internal registers of functional units. The structure and format of a "State" type message is presented in Table 3 below.

TABLE 3

| MSB | | | | | | | | | | | | | | | | State Message | | | | | | | | | | | | | | | LSB |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 0 | rw | Data Count | | | | | | | | | 0 | Category Select | | | | Register Select | | | | | | | | | | | | | | | |
| Data | | | | | | | | | | | | | | | | | | | | | | | | | | | | | | | |

As shown in Table 3, there are various fields defined within a State type message. The operation or content of these fields is defined below in Table 4.

TABLE 4

| Field | Bits | Function |
|---|---|---|
| rw | 30 | Read-Write select. 0-Write; 1-Read. |
| Data Count | 29:23 | Specifies [0 . . . 127] inclusive data words to accompany a buffered message. |
| Category Select | 19:15 | Selects a category of registers to access.<br>0 × 00-Video Display     0 × 10-Shared<br>0 × 04-Geometry         0 × 12-Host Interface<br>0 × 07-Shader             0 × 13-BINC<br>0 × 08-Rasterizer        0 × 15-DMA<br>0 × 09-Frame Buffer |
| Register Select | 14:0 | Selects a register to access within the category. |
| Data | 31:0 | Context dependent data. |

Work queue messages directed to the QNM 182 are parsed and interpreted by the work queue routines executing within the QNM 182 file address space. Those routines are free to examine all messages for content that may affect QNM 182 behavior. One message type is reserved for the sole use of the QNM 182. This message type is referred to as a QGO message (Table 5 shows the message structure for a QGO message), which the work queue interpreter (not explicitly shown) uses to change its point of execution to the register file location indicated in the message. This provides a compact and efficient way to effect a complex operation within the QNM. The message list at that location may well effect a return to the work queue interpreter.

Utilization of additional data words included with the QGO is a function of the routine called. Additionally, work queue responders can further pad the data count to accommodate packet framing on the network of serial links.

TABLE 5

| MSB | | | | | | | | | | | | | | | | QGO Message | | | | | | | | | | | | | | | LSB |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 0 | 0 | Data Count | | | | | | | | | 7 | | | | Ind | | | Register File Address | | | | | | | | | | | | | |

As shown in Table 5, there are various fields defined within a QGO type message. The operation or content of certain of these fields is defined below in Table 6.

TABLE 6

| Field | Bits | Function |
|---|---|---|
| Register File Address | 15:0 | Specifies a word location within the 64 K-address space of storage local to the QNM. The resolved address is the beginning of a list of QNM messages. |
| Ind | 18 | Indirect resolution via the value contained at the specified register file address. |

Indirect addressing can provide isolation between producers and consumers via a pointer. An important implication of a QGO message is the ability to synthesize new message types for functional units receiving messages. The QNM 182 can use the QGO message to insert new messages into the work queue interpreter. Since the QGO message is a pointer into some subroutine, it may be used by a programmer to create new commands that are not predefined in a given functional unit.

Within the QNM's register file, another set of messages may be used to implement the behavior of the QNM 182. A buffered work queue QGO message may also be a valid QNM message. The QNM 182 may have read access to all nodes' local storage via the network of serial links, and read/write access to the local storage 175 of its own node 180. It may be allocated a portion of that storage to use at its discretion and may be explicitly directed by subroutine messages to load/store specified information to/from the local storage.

The QNM 182 may also manage a large number of queue and stack structures that are highly dynamic. Due to the number of structures, reserving a fixed portion of register file space for each is undesirable. Also, the dynamics of interactions between functional units is expected to shift the structures that contain the most data at any given instant. Therefore, mechanisms to support dynamic allocation of storage may be included.

Having described the high-level structure and operation of the basic elements of a graphics system constructed in accordance with the invention, it should be appreciated that the system has a novel architecture, where functional units contained within nodes, such as a texture mapper and a geometry accelerator, communicate via a router based network, comprised of nodes with point to point serial links. The serial links establish a medium for originator nodes to request packets of data to be returned from the local storage space of responder nodes on the network. The local storage space may be a physical RAM or a virtual representation of that RAM, such as caches and queues. Nodes without a direct link are routed by the QNM 182 via intermediate nodes. In the preferred embodiment, writes to the local memory space of a remote node not permitted. Instead, resources and work are distributed such that only writes to the local space of a node are required.

To illustrate on how work may or data may be distributed among nodes of a system, consider the SRU 189. The SRU is a continuous process that is not driven by work queues, except to modify its modality (display resolution, front buffer selection, etc). The process of composition is partitioned based on the spatial locality of the image surface representing the display. This process can access multiple image surfaces, independent of their own spatial locality. Surfaces aligned with the display may have the same spatial locality.

The process of updating the display is local to the location of the display driver (DAC or digital). In this regard, it is preferred that there be only a single driver for the display. This avoids issues with alignment of pixels on the actual display. The display update process will access composed images from the appropriate nodes.

With regard to the geometry accelerators, work may be distributed among the various geometry accelerators in a system in a way that seeks to maintain a balanced work load among the various geometry accelerators. As is known, the data that is operated on by the geometry accelerators is in user coordinates, as opposed to screen coordinates. Therefore, there is no practical way to divide work among the geometry accelerators based upon spatial locality. However, it can be divided up based upon load balance.

In this regard, the various geometry engines will generally poll their respective work queues from the host interface QNM, as they become idle or need work. The host interface QNM can monitor this polling activity to determine which geometry accelerators are less busy, and can allot additional primitives to those geometry accelerators. In this way, the host interface QNM can distribute work among the various geometry accelerators in a way that most efficiently balances the work load.

With regard to the rasterizers, after the work is performed by the geometry accelerators, work can be distributed based upon spatial locality. That is, after the geometry accelerators have completed their work on the data, the data has been projected into screen space. With a screen space projection of the work, the hierarchical tiler 184 can determine which rasterizers are associated with particular areas of the display (screen space) and work may be appropriately directed to rasterizers based upon that screen space projection.

With regard to texture mapping, after computation of texture parameters to the pixel or even sub-pixel level, the spatial locality of individual texels can be determined. In general, there is no correlation of the texture's spatial locality with that of the image's. This may lead one to redistribute texel computations to different nodes again. There are several practical limiters to this. First, the computations for a single pixel may require texel samples from a number of nodes. Second, the rasterization process produces a number of per pixel values that do not relate directly to the texel computation, but rather the later z/blend computations. These values may be re-correlated to the texel values with some method.

Ideally, it would be beneficial to load balance at each stage of the pipeline, if inter-node communication could be expanded without cost. Since this is not the case, work is preferably distributed to the node indicated by image spatial locality, pipeline parameters through more traditional FIFO storage means, and to provide texture mapping with the facility to read texel samples independent of spatial locality.

For a functional unit to effect a sequence of actions in another unit, sequences of messages are produced, which are written into the local storage space of the effector node. In the preferred embodiment, and as described above, a message is a series of thirty-two bit words composed of a command word followed by data words used to perform the indicated action. An affected functional unit consumes the sequence from an agreed upon location, interpreting messages as intended. A sequence of messages is referred to as a work queue, which has also been described above. Functional units consume work queues on their inputs and produce work queues on their outputs. In this respect, a producer node will produce a work queue into its own local memory space. In contrast, a consumer node will pull data, instructions, or other information (as it needs it) from the producer's memory. In this way, coherency is maintained in a simplified manner. It should be appreciated that if a consumer requests data or information that is not yet ready, the data or information will not be returned to the consumer (until the data or information has been produced by the producer).

The effector and affected functional units need not reside in the same physical node. A programmable pointer specifies space for a queue in the local storage space of an explicit node, allowing producers and consumers to be disjoint. Specifying the producer and consumer pointers independently enhances scalability by allowing a new functional unit to be inserted without the knowledge of the old units. Functional units access queues via a FIFO-like interface, with management of node storage addresses performed by a QNM.

By way of example, the execution of a message by a functional unit may require information not explicitly provided in the work queue. For instance, an action may be to render a triangle primitive with an applied texture or to sequence the information representing an image through a DAC. The required information is requested directly by the functional unit via its dedicated interface to its node's memory subsystem interface or via a dedicated port to the QNM 182. For example, the shader 186 of FIG. 5 may communicate directly with the memory controller 188, or alternatively may communicate through a dedicated port to the QNM 182, such that the QNM 182 may determine whether data to/from the shader 186 is local or remote. The memory subsystem determines which node's local storage contains the information, originating a request on its interface to the network if on a remote node, or originates access to its own local storage interface if not on a remote node. Multiple requests may be originated to compensate for the latency of responses returning.

Giving QNMs the ability to change queue pointers effects flow control in the work queue paradigm. For instance, it may be desirable to source a consumer work queue from a sequence of producers. Augmenting the abilities of the QNM with a message class for accessing routines stored in a register file contained within the QNM can create a wide variety of useful behaviors, such as round robin sequencing of a class of units, or save and/or restore context to local storage space. Moreover, all behaviors of the QNM are determined by routines that transfer and interpret the contents of message queues, which as a result may access higher level routines. The exact behavior to be expected is preferably determined by the implementation programmed into the QNM.

Figure 7:
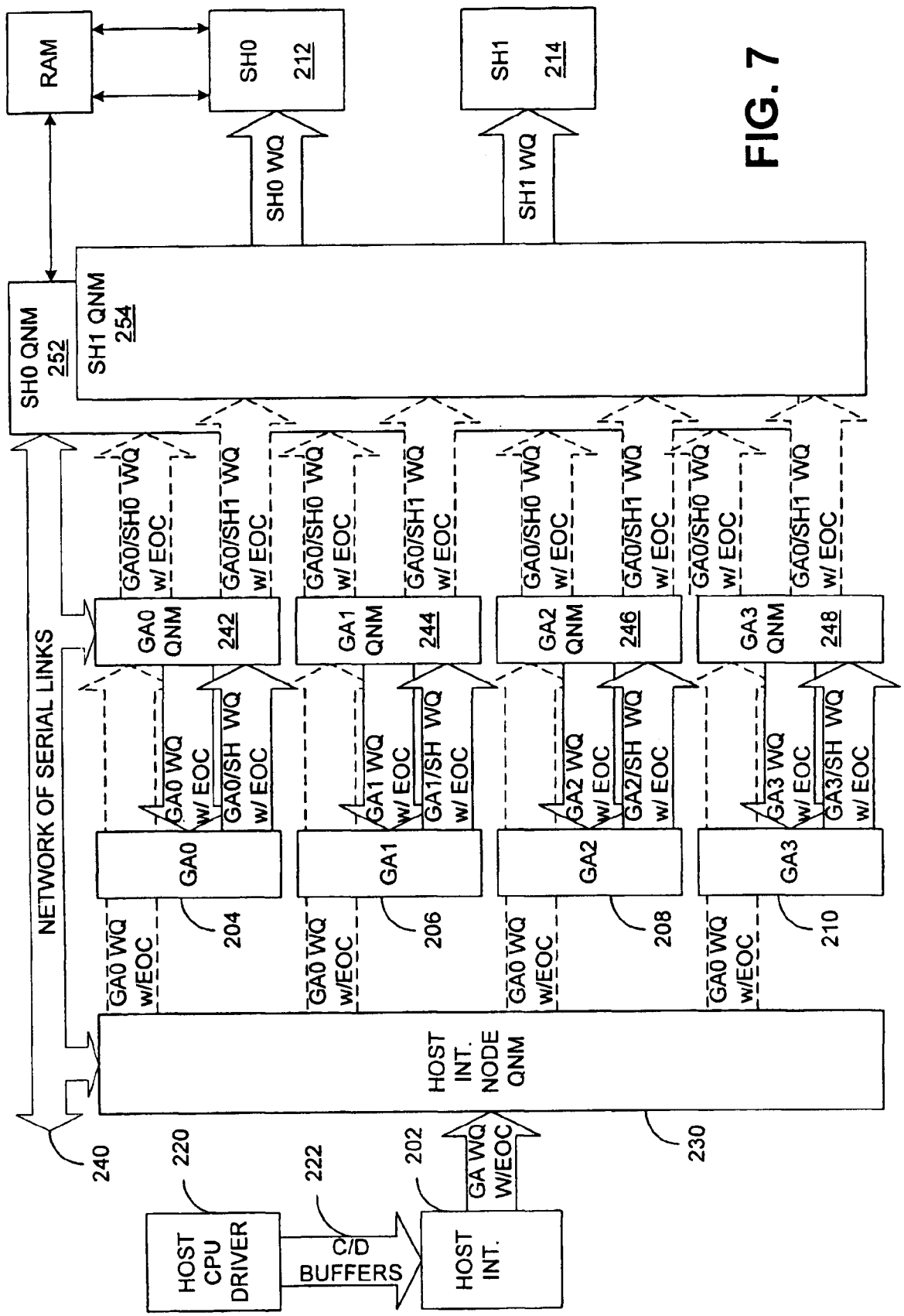
FIG. 7 is a diagram illustrating an examplar work queue flow through a nodal graphics system having four parallel geometry accelerators and two shaders.

To provide a simple illustration of the usage of this paradigm, reference is made briefly to FIG. 7, which illustrates the concept of functional units communicating via work queues. Specifically, FIG. 7 illustrates a host interface 202, four geometry accelerators (GAs) 204, 206, 208, and 210, and two shaders 212 and 214. The device driver 220 on the host writes the I/O bus with messages 222 in the form of command/data buffers, which the host interface 202 translates to work queue messages, written to the host interface QNM 230. In the illustrated embodiment, after every fourth complete drawing primitive, the host interface QNM 230 synthesizes an End-Of-Chunk (EOC) message to effect load balancing. An EOC message is a QGO message (described above) that effects an end of chunk (discuss further herein).

It should be appreciated that the dashed line arrows represent logical communications between devices. Actual communications between such devices are not direct, but rather occur over the network of serial links and through the QNMs of the respective nodes.

The QNM 230 executes a message list initiated after power up that parses the work queue (in the memory local to the QNM), distributes state messages to all geometry accelerator work queues, and distributes work messages to a single geometry accelerator work queue, up to the next EOC. This EOC invokes a subroutine message list that may choose the next geometry accelerator from a round robin sequence, and synthesizes a shader EOC into the active geometry accelerator work queue. Each geometry accelerator 204, 206, 208, and 210 consumes its work queue and produces a work queue for shaders 212 and 214. Messages that are not directly executable by a geometry accelerator are propagated to its output, while others denote drawing primitives that result in the synthesis of new shader messages. The QNM also executes another message list initiated after power up that parses the shader work queue, distributes state messages to all shader work queues, and distributes work messages to each shader work queue as indicated by spatial information contained in the messages.

As illustrated, communication with the network 240 is performed by the various QNMs. For example, the host interface QNM 230 communicates the work queue messages for the geometry accelerators 204, 206, 208, and 210 to the network 240. These work queue messages are received from the network 240 by the respective QNMs 242, 244, 246, and 248 for the geometry accelerators 204, 206, 208, and 210.

Conceptually, any number of functional units can reside in a node, each of which independently produces and consumes its own work queues. The actual number of functional units present in a given node dictates the resources required within the QNM and contributes to bandwidth consumption on the network. The bandwidth in/out will preferably not exceed the available bandwidth on a node's portion of the network, effectively capping the complexity of the QNM, even though additional producers and consumers may be served. A heterogeneous set of node classes allows anisotropic distribution of functional unit types and eases introduction of new types of functional units to the network, thus enhancing scalability.

Multiple functional units can work concurrently without deadlock because each functional unit's communication sequence order is maintained independently of other functional units. Preferably, the granularity of communication on the network 240 is fine enough that no functional unit can significantly delay another functional unit from accessing the network. Instead, only the particular functional unit that originated a given request for an unavailable packet is stalled. Other sequences continue along the network 240 independently. Work queues are structured to come to an end, without stranding an origination without a response indefinitely. Queues utilizing mechanisms such as the EOC above include routines in the producer and consumer QNMs to prevent origination of requests beyond the logical end of or transitions between queues by looking ahead and inserting a QNM message that serves to warn of the upcoming EOC.

The pervasive need to synchronize operations between functional units is also realizable with the queue concept. Each unit to be synchronized produces a short queue that is simply a return. In this context, a return may be simply a contentless packet retrieved from the designated address, and there may be no interpretation or execution of the returned value. A single designated unit jumps to consume each queue in turn. When it successfully retrieves the last queue, it produces queues for each unit. Production is completed essentially at the same time, enabling each functional unit to complete its consumption, continuing their work queues in near synchrony.

With regard to work queue production, a sequence of messages produced in one functional unit can be partitioned into sequences to be consumed by multiple units. The sequence may contain portions to be duplicated for all target units (state) and portions that are to be processed by a subset of the target units (work). The state portion may be further divided into portions that are optimizable (earlier writes of the same message may be removed) and those that are not. The target for the work portion can be predetermined by its contents or can be dynamically determined by first available, with intermediate units in round robin sequence receiving empty work portions.

Whenever optimizable state is found in a sequence to be partitioned, it is saved as the active state and all functional units are marked. Messages for manipulation of register file words as bit arrays facilitate these actions. Whenever work is to be placed in a target work queue, all of the marked active state is first placed in the work queue. In this way, a functional unit with work will have the active state without receiving all state transitions between work messages.

Furthermore, it is possible to identify sequences that can be made more efficient for the producer, consumer, and/or the network 240 bandwidth by introducing QNM messages that manipulate work messages at an appropriate functional unit input or output. For example, if a plurality of successive messages were used to communicate different portions of vertex data (e.g., coordinates and values for X, Y, Z, R, G, B, Alpha, S, T, etc.) to a node, a single message package could be constructed to send all of this data in a single packet. This would reduce the amount of "header" information that is communicated in the multiple messages.

Figure 8:
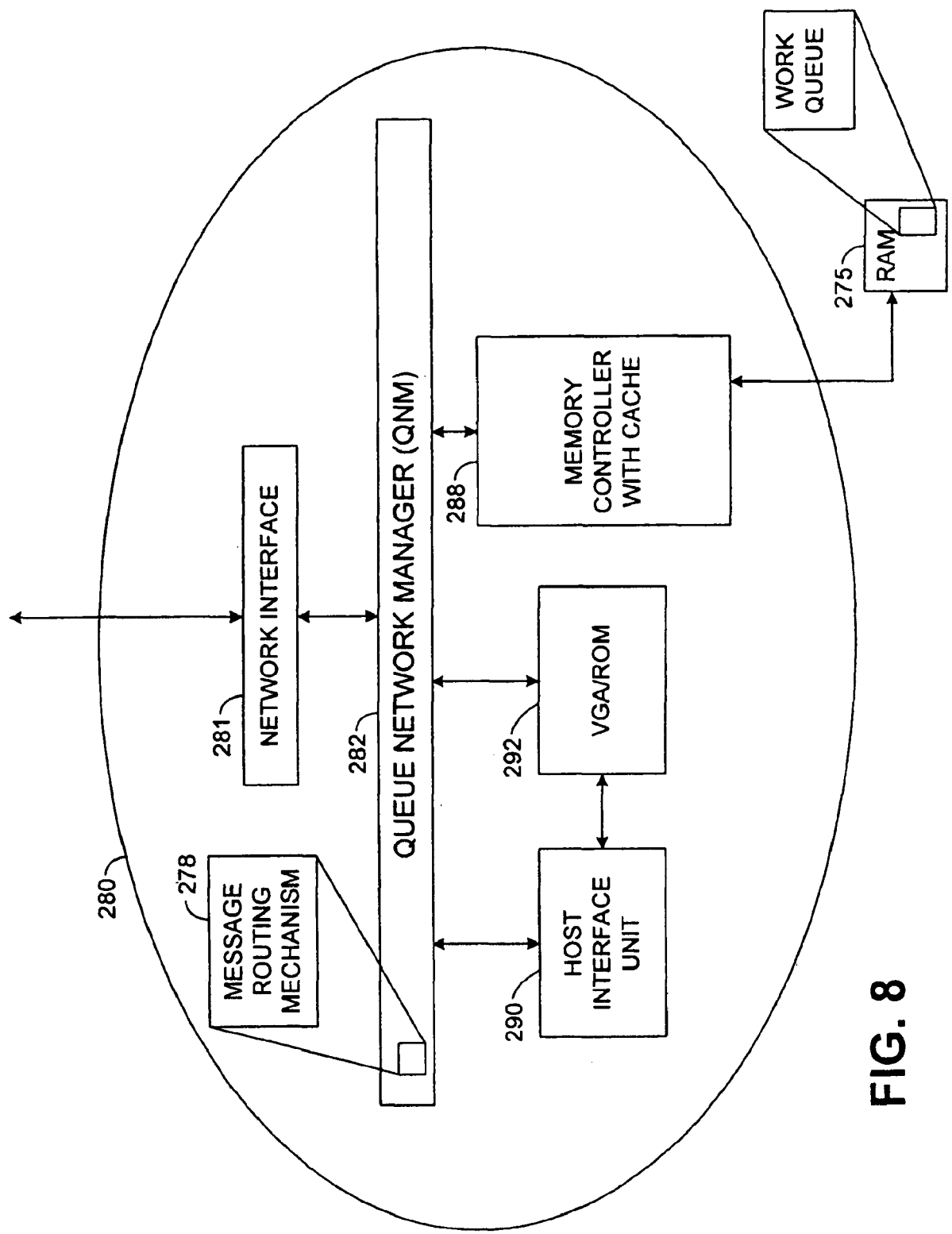
FIG. 8 is a diagram illustrating a node similar to the node of FIG. 5, but having differing functional units.

Reference is now made briefly to FIG. 8, which illustrates a node 280 similar to the node 180 of FIG. 5, but having differing functional units. In this respect, FIG. 5 illustrated a node 180 for carrying out certain graphics processing functions in a computer graphics system. Like the node of FIG. 5, the node 280 illustrated in FIG. 8 includes a network interface 281, a QNM 282, a memory controller 288, and a dedicated RAM 275. The node 280 also illustrates a host interface unit 290 and a VGA/ROM 292.

This node 280, or one like it, operates to coordinate initialization and communication of other nodes with the host computer. The functional unit 290 serves as a host interface and operates to communicate with the host. Upon startup, other nodes in the system may communicate with node 290 to receive instruction. That is, upon startup, other nodes (consumers) may read from the host interface 290 to obtain their setup and configuration information. During this early communication, the other nodes may be instructed as to where they are to read their work queues.

The block labeled as VGA/ROM 292 may communicate with both the QNM 282 and the host interface unit 290. The VGA/ROM 292 may provide graphics initialization, by communicating with the graphics BIOS (basic input output service), before the graphics system and driver of the present invention assume control of the display.

The particular manner in which initialization and communications with the host occur through node 290 are not limiting upon the present invention, and could be implemented by persons skilled in the art. Accordingly, details regarding these aspects and features need not be described herein.

Distributed Shared Memory

Having described the environment of the preferred embodiment of the present invention, certain inventive features of the preferred embodiment will now be discussed. In this regard, one inventive aspect of the preferred embodiment may be viewed as a distributed shared memory. Shared or unified memory systems are well known, wherein a memory system is shared by multiple subsystems or functional/processing units. Distributed memory systems are also known, wherein memory is distributed for use among various functional/processing units. The distributed shared memory aspect mentioned above capitalizes on benefits from both shared and distributed approaches. First, it provides certain benefits from distributed memory systems, such as distributed bandwidth (avoiding memory bandwidth bottlenecks). At the same time, it allows sharing of memory resources, thereby avoiding the replication of data among multiple memory devices. In the preferred embodiment, access to the memory devices is limited, such that write access to a memory device may be performed only by functional units of the associated node. However, read access is permitted to all nodes.

Figure 9:
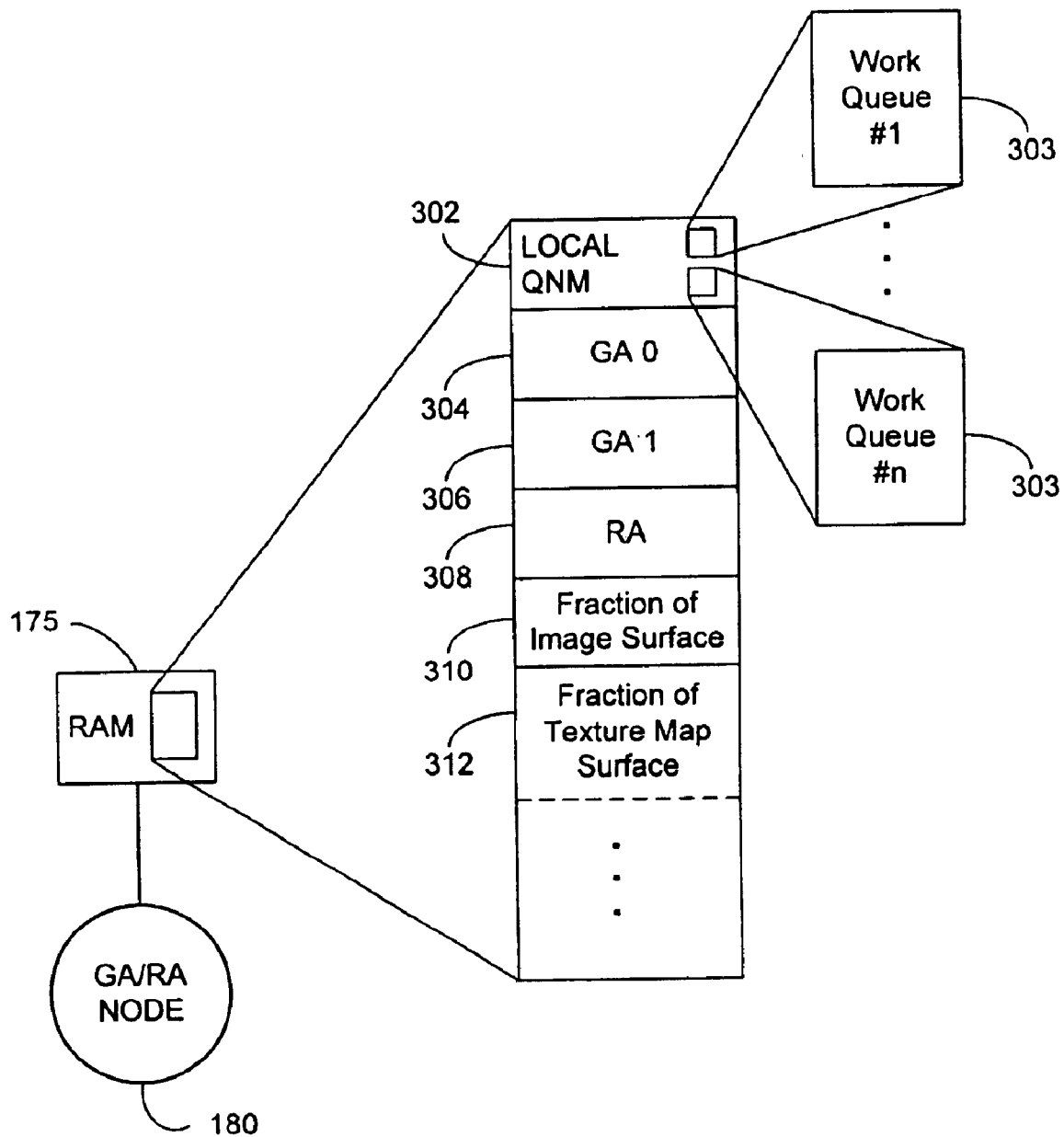
FIG. 9 is a diagram illustrating one example of a potential memory segmentation scheme that may be employed by a graphics node like the one illustrated in FIG. 5.

Reference is now made to FIG. 9, which illustrates one example of a potential memory segmentation scheme that may be employed by a graphics node like the one illustrated in FIG. 5. It should be appreciated, however, that numerous other segmentation schemes may be employed consistent with the scope and spirit of the present invention. In the embodiment illustrated in FIG. 9, a memory 175 that is local to a node 180 for carrying out a graphics processing function may include a number of dedicated segments. One segment 302 is dedicated to the QNM 182 (FIG. 5) of the local node 180. Among other data and information that may be stored in the space, this dedicated memory space 302 may include a plurality of work queues 303. In this respect, the QNM 182 acts as a producer node producing work queues for consuming nodes. In conjunction, consuming nodes may read from these work queues 303.

Other memory segments of the memory 175 may include a segment 304 for a first geometry accelerator, a segment 306 for a second geometry accelerator, a segment 308 for a rasterizer, a segment 310 containing a fraction of an image surface, a segment 312 containing a fraction of the texture surface. With regard to the geometry accelerator and rasterizer segments, since those components are "consumers" the memory segments need not store work queues (since only producer components require storage for work queues). The unified memory structure of the present invention allows texture surfaces to be partitioned and stored across multiple nodes. This is particularly unique insofar as texture surfaces do not readily map spatially to the image being displayed.

Accordingly, the present invention includes a mechanism for modifying work queues based upon the segmentation of the memories of the various nodes. This mechanism differs depending upon the functional units associated with the memory segmentation. As previously discussed, the host interface may include a mechanism (not specifically illustrated) for distributing work among the geometry accelerators in a manner to effect load balancing among the geometry accelerators of the various nodes. Another mechanism (e.g., the hierarchical tiler 184) may be used to distribute work among the various rasterizers based upon spatial locality. Other such mechanisms may be similarly utilized to distribute work based upon the memory segmentation.

In the illustrated embodiment (e.g., FIG. 5), memory devices are allocated and associated with nodes, wherein each node contains at least one functional unit for processing data. There are a number of advantages to such a system architecture, particularly in a computer graphics environment. Some of these advantages include providing a unified surface definition, allowing the sharing of textures without replication of the textures in multiple memories, allowing an image surface to define a texture, enabling distributed storage of display lists within a computer graphics card, allowing all geometry accelerators to have access to the display lists, scalability of texture bandwidth as the graphics system is scaled, and the support of large memory configurations. With regard to the support of large memory configurations, such configurations provide enhanced support for texture mapping, anti-aliasing, and display list storage.

As is known, a display list is a list of graphic primitives that are stored local to the graphics hardware. The implementation and use of display lists are well known, and were developed years ago, when the speed of the graphics hardware was faster than that of the host CPU. Evolutionally, CPU speed improved and the use and implementation of display lists began to decrease. However, the speed and power of graphics hardware is again outperforming that of most host CPUs, making the use and implementation of display lists more desirable. It should be appreciated that a distributed, shared memory structure of the present invention would make the implementation of a display list a trivial thing.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A system of integrated circuit components defining a plurality of nodes and a random access memory (RAM) connected to each node, each node comprising:

at least one functional unit configured to carry out a predetermined processing function;

a communication mechanism configured to manage and control communication of information with other nodes;

a memory controller configured to control writes to and reads from the RAM connected to the node;

wherein the system is further configured to permit read access to a RAM by a plurality of the nodes in the system, but is further configured to limit write access to a RAM to only the node to which the RAM is connected.

2. The system of claim 1, wherein the system is a computer graphics system.

3. The system of claim 1, wherein the at least one functional unit is one selected from the group consisting of a texture mapping component, a geometry accelerator, a shader, a z/blend component, a rasterizer, a tiler, and a cache controller.

4. The system of claim 1, wherein each node further includes control means for controlling the use and access of memory storage by remote functional units.

5. The system of claim 4, wherein the control means includes a memory segment containing at least one work queue, the work queue being in the form of a first-in-first-out instruction queue for the at least one functional unit.

6. The system of claim 5, wherein the work queue contains a plurality of messages.

7. The system of claim 6, wherein messages may be communicated between different nodes under control of the control means.

8. The system of claim 4, wherein the RAM is segmented to include at least one segment dedicated to the control means of the connected node and at least one additional segment dedicated to carrying out a functional operation of the system.

9. The system of claim 1, wherein the plurality of nodes are interconnected via a plurality of serial communication links.

10. A system of integrated circuit components comprising:
a plurality of nodes interconnected by communication links;
a random access memory (RAM) connected to each node;
at least one functional unit integrated into each node, each functional unit configured to carry out a predetermined processing function;
each node containing a coherency mechanism configured to permit only read access to the RAM by other nodes, the coherency mechanism further configured to permit write access to the RAM only by functional units that are local to the node.

11. The system of claim 10, wherein a work queue comprises at least one message, the at least one message containing an instruction of the at least one functional unit of the associated node.

12. The system of claim 11, wherein messages may be communicated between different nodes under control of the control means.

13. The system of claim 12, wherein the plurality of nodes are interconnected via a plurality of serial communication links.

14. A system of integrated circuit components comprising:
a plurality of nodes interconnected by communication links;
a random access memory (RAM) connected to each node, wherein the plurality of RAMs in the system are configured as a unified RAM;
at least one functional unit integrated into each node, each functional unit configured to carry out a predetermined processing function; and a coherency mechanism within each node, the coherency mechanism configured to permit read access to a given RAM by any of the plurality of nodes, the coherency mechanism further configured to permit write access to the given RAM only by functional units of the node connected to the given RAM.

15. The system of claim 14, wherein the at least one functional unit is one selected from the group consisting of a texture mapping component, a geometry accelerator, a shader, a z/blend component, a rasterizer, a tiler, and a cache controller.

16. The system of claim 14, wherein the coherency mechanism includes a memory segment containing at least one work queue, the work queue being in the form of a first-in-first-out instruction queue for the at least one functional unit.

17. The system of claim 16, wherein the coherency mechanism further includes logic for responding to messages stored within the work queue to control read and write access to the RAM connected to the node.

18. A system, comprising:
a plurality of nodes and a random access memory (RAM) connected to each node; each node comprising:
a communication mechanism configured to manage and control communication of information with other nodes, the information being communicated within messages that are communicated among the nodes;
logic configured to manage a work queue within the connected RAM, wherein the work queue is populated by messages received from the plurality of nodes;
a memory controller configured to control writes to and reads from the RAM connected to the node, the memory controller being responsive to messages contained within the work queue; and
wherein the plurality of RAMs are collectively managed as a unified memory space such that data stored in one RAM is not duplicatively stored in another RAM, and wherein the memory controller of each node is configured to permit read access to the connected RAM both a functional unit within the connected node and by remote nodes, but the memory controller of each node is further configured to limit write access to the connected RAM to only the node to which the RAM is connected.

19. In a computer graphics system implemented in a distributed, nodal architecture, a method for performing geometry accelerator computations comprising:
writing input/output (I/O) messages from a device driver on a host in the form of command/data buffers;
translating the command/data buffers into work queue messages;
writing the work queue messages to a host interface communication mechanism;
distributing the messages to a plurality of geometry accelerator work queues;
propagating to an output of each geometry accelerator all messages that are not directly executable by the geometry accelerators; and
producing, by each geometry accelerator, a work queue for shaders, wherein the work queue for shaders comprise messages denoting drawing primitives.

* * * * *